US005089056A

United States Patent [19]

Shi et al.

[11] Patent Number: 5,089,056

[45] Date of Patent: Feb. 18, 1992

[54] OPACIFYING KAOLIN PIGMENTS AND PROCESS FOR MAKING SAME BY REACTING WITH SODIUM HYDROXIDE IN WATER

[75] Inventors: Joseph C. S. Shi, Bartow; Jerry L. Curtis, Milledgeville; Timothy L. Salter, Sandersville, all of Ga.

[73] Assignee: Thiele Kaolin Company, Sandersville, Ga.

[21] Appl. No.: 341,723

[22] Filed: Apr. 21, 1989

[51] Int. Cl.[5] .................... C04B 14/04; C04B 33/04

[52] U.S. Cl. .................... 106/486; 106/487; 501/127; 501/147

[58] Field of Search .................... 106/486, 487; 501/147, 501/127

[56] References Cited

U.S. PATENT DOCUMENTS

| | | | |
|---|---|---|---|
| 3,694,202 | 9/1972 | Sawyer | 162/138 |
| 3,736,165 | 5/1973 | Sawyer | 106/487 |
| 3,765,825 | 10/1973 | Hurst . | |
| 3,769,383 | 10/1973 | Hurst . | |
| 3,784,392 | 1/1974 | Bertorelli . | |
| 3,837,877 | 9/1974 | Bertorelli . | |
| 3,850,653 | 11/1974 | Zentz, Jr. | 106/486 |
| 3,937,632 | 2/1976 | Nott | 106/486 |
| 4,017,324 | 4/1977 | Eggers | 106/487 |
| 4,075,030 | 2/1978 | Bundy et al. . | |
| 4,075,280 | 2/1978 | Fitton et al. . | |
| 4,076,548 | 2/1978 | Bundy et al. . | |
| 4,078,941 | 3/1978 | Bundy et al. . | |
| 4,106,949 | 8/1978 | Malden | 106/487 |
| 4,186,027 | 1/1980 | Bell et al. | 106/486 |
| 4,240,936 | 12/1980 | Henning | 106/487 |
| 4,299,807 | 11/1981 | Angel et al. | 106/486 |
| 4,650,521 | 3/1987 | Koppelman et al. | 106/487 |
| 4,657,593 | 4/1987 | Aignesberger et al. | 106/487 |
| 4,678,517 | 7/1987 | Dunaway . | |
| 4,738,726 | 4/1988 | Pratt et al. . | |
| 4,806,167 | 2/1989 | Raythatha | 106/487 |
| 4,812,299 | 3/1989 | Wason . | |
| 4,842,651 | 5/1989 | Ravet et al. | 106/487 |
| 4,851,048 | 7/1989 | Jones et al. . | |
| 4,879,058 | 11/1989 | Wason . | |
| 4,879,323 | 11/1989 | Wason . | |
| 4,902,657 | 2/1990 | Wason . | |
| 4,902,729 | 2/1990 | Wason . | |
| 4,933,387 | 6/1990 | Wason . | |

FOREIGN PATENT DOCUMENTS

| | | | |
|---|---|---|---|
| 1101825 | 5/1978 | Canada | 252/15 |
| 59-133265 | 7/1984 | Japan . | |
| PCT/US86/00158 | 1/1987 | PCT Int'l Appl. . | |
| 1011660 | 4/1983 | U.S.S.R. | 106/486 |
| 1268594 | 11/1986 | U.S.S.R. | 106/487 |
| 1348360 | 10/1987 | U.S.S.R. | 106/487 |
| 0706537 | 3/1954 | United Kingdom | 106/486 |

OTHER PUBLICATIONS

*Zeolite Molecular Sieves,* Donald W. Breck, 1974, John Wiley & Sons, pp. 313-320.

*Primary Examiner*—Paul Lieberman
*Assistant Examiner*—John Boyd
*Attorney, Agent, or Firm*—Jones, Askew & Lunsford

[57] ABSTRACT

An opacifying pigment with enhanced light scattering properties for use as a paper coating or filler material is produced by reacting kaolin in the presence of water with sodium hydroxide or potassium hydroxide at a temperature in excess of 60° C. The kaolin is reacted with the hydroxide in a concentration to produce a molality of at least 0.1.

12 Claims, No Drawings

OPACIFYING KAOLIN PIGMENTS AND PROCESS FOR MAKING SAME BY REACTING WITH SODIUM HYDROXIDE IN WATER

TECHNICAL FIELD

This invention relates to opacifying pigments made from kaolin products for use as paper coating and filler materials.

BACKGROUND OF THE INVENTION

Kaolin is widely employed as a pigment in the manufacture of paper to improve the printing characteristics of the paper and to provide a glossy, white, opaque finish. It has long been recognized that the addition of $TiO_2$ (titanium dioxide) to paper coating formulations comprised of kaolin, a dispersing agent, adhesives, and other additives improves the opacity of the coating film. Opacity in paper coatings is caused by the light scattering ability of the pigment which can be estimated by the scattering coefficient as described in Tappi, 1978, Vol. 61, No. 6, p. 78–80.

Several modified kaolin products have been developed to replace, at least partially, the more expensive $TiO_2$. These modification treatments generally fall into three categories. Firstly, kaolin may be calcined at a temperature above 900° C. to produce an opacifying material such as described in U.S. Pat. Nos. 4,078,941 and 4,678,517. A second method, such as described in U.S. Pat. Nos. 4,075,030, 4,738,726, and 4,076,548, involves treatment of kaolin with organic reagents which chemically bridge between particles and flocculate the fine particles. A third method of producing an opacifying pigment, described by International Patent Application No. PCT/US86/00158, involves treating kaolin with a metal chloride.

In general, the just described methods seek to structure the kaolinite particles into agglomerates which incorporate light scattering voids in the pigment. These structured pigments must preserve their light scattering voids during paper coating and calendering, a requirement which limits the use of weakly flocculated kaolins. Pigments with increased light scattering characteristics, compared with untreated kaolin, have sometimes been termed "high bulking" owing to this presence of voids in the kaolin particle structure.

The goal in all of these product developments has remained the same, namely to provide inexpensive pigments, compared to titanium dioxide, that may be relatively sparsely employed for even further economy, and yet which nevertheless provide good opacity, brightness and reflectance as coating and filler materials, particularly for use on paper.

SUMMARY OF THE INVENTION

We have now discovered that a pigment with improved light scattering properties may be made by reacting kaolin, i.e., a natural material composed of kaolinite ($Al_2Si_2O_5(OH)_4$), in the presence of water with sodium hydroxide and/or potassium hydroxide at a temperature of at least 60° C. The hydroxide should be in sufficient concentration to produce a molality of at least 0.1, and preferably at least 0.2, and the kaolin present in a concentration between 5 percent and 70 percent by weight with respect to water. Where the reaction conditions are such as to produce hydroxysodalite in a sufficient concentration in the reaction product as to discolor it, and thereby render it insufficiently white for conventional paper coating usage, the reaction product is then leached with iron reducing agent, such as sodium hydrosulfite, to remove discoloring constituents. When applied to paper in a typical paper coating formulation, the pigment improves the TAPPI opacity of the coating while at least preserving other coating characteristics such as brightness and gloss. Additionally, the reacted kaolin has been found to display a low abrasive value compared to calcined kaolin.

Although it has not yet been possible to identify precisely the causes of the kaolin structure formation, it is believed the action of the sodium hydroxide and potassium hydroxide on the kaolin modifies the kaolinite particles so as to cause them to organize into extremely stable aggregates which incorporate light scattering sites.

EXAMPLE 1

This sample was a control of Georgia kaolin that is used as the starting material in Examples 2–10. This kaolin is marketed by the Thiele Kaolin Company of Sandersville, Ga. under the name Kaofine.

EXAMPLE 2

The following reagents were added to 5375 grams of water and mixed at room temperature until the solid material was completely dissolved: 87.5 grams of NaOH and 122.7 grams of KOH. One thousand grams of Kaofine kaolin was added to the solution and mixed briefly until a homogenous suspension was obtained. The slurry was transferred to a two gallon pressure reactor and treated at 150° C. After one hour the reactor was cooled to approximately 30° C. and the sample was immediately filtered. Following this the filter cake was suspended in water at 20 percent solids and refiltered. The previous step was repeated one additional time. The resulting filter cake was again suspended at 20 percent solids and the pH of the sample was adjusted to 7.8 with hydrochloric acid. After the final filtration, the product was dispersed with 0.5 percent potassium polyacrylate and spray dried. All percentages reported in this and the following examples are compared to the dry weight of the reacted kaolin.

EXAMPLE 3

The following ingredients were reacted for one hour at 190° C. in a pressure reactor: 1000 grams of Kaofine kaolin, 5375 grams of water, and 21.5 grams of NaOH. The sample was cooled, filtered, and the filter cake resuspended at 20 percent solids and refiltered. The previous step was repeated two additional times. The sample was dispersed with 0.3 percent polyacrylic acid in 400 milliliters of water. The pH of the suspension was adjusted to 7 with soda ash, and the sample was spray dried.

EXAMPLE 4

The following ingredients were reacted for one hour at 130° C. in a pressure reactor: 1000 grams of Kaofine kaolin, 5375 grams of water, 88.2 grams of sodium hydroxide. The sample was cooled, filtered, and the filter cake resuspended at 20 percent solids and refiltered. The previous step was repeated two additional times. The sample was dispersed with 0.3 percent polyacrylic acid in 400 milliliters of water. The pH of the suspension was adjusted to 7 with sulfuric acid and the sample spray dried.

EXAMPLE 5

The following ingredients were reacted for one hour at 150° C. in a pressure reactor: 1000 grams of Kaofine kaolin, 5375 grams of water, 43.8 grams of sodium hydroxide. The sample was cooled, filtered, and the filter cake resuspended at 20 percent solids and refiltered. The previous step was repeated two additional times, but in the third resuspending stage the pH of the sample was adjusted to 7.5 with sulfuric acid and the mixture treated with 0.25 percent alum and 0.45 percent sodium hydrosulfite leach. After filtration the sample was dispersed with 0.3 percent sodium polyacrylate and spray dried.

EXAMPLE 6

The following ingredients were reacted for one hour at 100° C. in a pressure reactor: 1000 grams of Kaofine kaolin, 5375 grams of water, 87.5 grams of sodium hydroxide. The sample was cooled, filtered, and the filter cake was then resuspended at 20 percent solids and refiltered. The previous step was repeated two additional times, but in the third resuspending stage the pH of the suspension was adjusted to 7.5 with sulfuric acid and the sample was treated with 0.25 percent alum and 0.45 percent sodium hydrosulfite leach. After filtration the sample was dispersed with 0.3 percent sodium polyacrylate and spray dried.

EXAMPLE 7

The following ingredients were reacted for one hour at 147° C. in a pressure reactor: 200 grams of Kaofine kaolin, 1075 grams of water, 80.0 grams of sodium hydroxide. The sample was cooled, filtered, and the filter cake resuspended at 20 percent solids and refiltered. The previous step was repeated two additional times, but during the third resuspending stage the pH of the suspension was adjusted to 5.0 with sulfuric acid and the mixture treated with 0.25 percent alum and 0.45 percent sodium hydrosulfite leach. After filtration the sample was dispersed with sodium polyacrylate and sodium hydroxide. The sample was then spray dried.

EXAMPLE 8

The following ingredients were reacted for one hour at 200° C. in a pressure reactor: 1000 grams of Kaofine kaolin, 5375 grams of water, 245.5 grams of potassium hydroxide. The sample was cooled, filtered, and the filter cake resuspended at 20 percent solids and refiltered. The previous step was repeated two additional times, but in the third resuspending stage the pH of the suspension was adjusted to 8.0 with hydrochloric acid. After filtration the sample was dispersed with 0.5 percent potassium polyacrylate and spray dried.

EXAMPLE 9

The following ingredients were reacted for one hour at 150° C. in a pressure reactor: 1000 grams of Kaofine kaolin, 5375 grams of water, 131.2 grams of sodium hydroxide. The sample was cooled, filtered, and the filter cake resuspended at 20 percent solids and refiltered. The previous step was repeated two additional times, but in the third resuspendinq stage the pH of the suspension was adjusted to 7.5 with sulfuric acid and the mixture was treated with 0.25 percent alum and 0.45 percent sodium hydrosulfite leach. After filtration the sample was dispersed with 0.3 percent sodium polyacrylate and spray dried.

EXAMPLE 10

The following ingredients were reacted for one hour at 170° C. in a pressure reactor: 1000 grams of Kaofine kaolin, 5375 grams of water, 87.5 grams of sodium hydroxide. The sample was then cooled, filtered, and the filter cake resuspended at 20 percent solids and refiltered. The previous step was repeated one additional time. After filtration the sample was resuspended at 20 percent solids and the pH of the suspension lowered to 7.0 with sulfuric acid. The sample was then treated with 0.25 percent alum and 0.45 percent sodium hydrosulfite leach. After filtration the sample was dispersed with 0.30 percent sodium polyacrylate and spray dried.

EXAMPLE 11

This sample was a control of Georgia Kaolin that is used as the starting material in Example 12. This kaolin is marketed by the Thiele Kaolin Company of Sandersville, Georgia under the name Kaofine 90.

EXAMPLE 12

The following ingredients were reacted for one hour at 150° C. in a pressure reactor: 1000 grams of Kaofine 90 kaolin, 5375 grams of water, 87.5 grams of sodium hydroxide, and 245.5 grams of potassium hydroxide. The sample was then cooled and filtered. The filter cake was resuspended in water at 20 percent solids and refiltered. The previous step was repeated once. After filtration the sample was resuspended, neutralized to 7.5 pH with HCL, and dispersed with 1 percent polyacrylic acid.

EXAMPLE 13

This sample was Kaogloss kaolin, a kaolin product of the Thiele Kaolin Company of Sandersville, Ga.

EXAMPLE 14

The following ingredients were reacted for one hour at 150° C. in a pressure reactor: 1000 grams of Kaogloss kaolin, 5375 grams of water, 400 grams of sodium hydroxide, 200 grams of sodium chloride. The sample was cooled, filtered, the filter cake resuspended at 20 percent solids and refiltered. The previous step was repeated two additional times, but in the third resuspending stage the pH of the suspension was adjusted to 7.0 with sulfuric acid and the mixture treated with 0.25 percent alum and 0.45 percent sodium hydrosulfite leach. After filtration the sample was dispersed with 2 percent sodium polyacrylate and spray dried.

EXAMPLE 15

The following ingredients were reacted for one hour at 150° C. in a pressure reactor: 1000 grams of Kaogloss kaolin, 5375 grams of water, 400 grams of sodium hydroxide. The sample was cooled, filtered, and the filter cake washed with water while it was in the filter bowl. The sample was then resuspended and the pH of the suspension adjusted to 5.5 with sulfuric acid. The sample was then treated with 0.25 percent alum and 0.45 percent sodium hydrosulfite leach. After filtration the sample was dispersed with 1.5 percent of a blend containing 60 percent soda ash and 40 percent sodium polyacrylate. An additional 0.95 percent sodium polyacrylate was added and the sample spray dried.

EXAMPLE 16

The following ingredients were reacted for one hour at 150° C. in a pressure reactor: 1000 grams of Kaogloss kaolin, 5375 grams of water, 175 grams of sodium hydroxide. The sample was cooled, filtered, and the filter cake resuspended at 20 percent solids and filtered. The previous step was repeated two additional times, but in the third resuspending stage the pH of the suspension was adjusted to 5.5 with sulfuric acid and the mixture treated with 0.25 percent alum and 0.3 percent sodium hydrosulfite leach. After filtration the sample was dispersed with 1.25 percent of a blend containing 60 percent soda ash and 40 percent sodium polyacrylate. An additional 0.1 percent sodium polyacrylate was added and the sample spray dried.

As previously stated, the kaolin employed in Examples 1 to 10 was Kaofine, Example 12 was performed with Kaofine 90, and Kaogloss was used in Examples 13 to 16. Kaogloss is a processed kaolin from Central Georgia which is prepared for paper coating purposes according to conventional industry practices. Kaofine is a paper coating kaolin from East Georgia of finer particle size than to Kaogloss. Kaofine 90 is a coating kaolin from East Georgia of extremely fine particle size. The process of the present invention is believed to work well on raw kaolin, on partly processed kaolin as well as on fully processed kaolin. The pressure reactor was used in the examples mainly to contain the self-generated steam pressure at each reaction temperature.

All samples were analyzed by a procedure described in The Journal of the Technical Association of the Pulp and Paper Industry, Vol. 61., No. 6 (June 1978). The scattering coefficients for each example obtained by this test are presented in Table 1.

TABLE 1

| Example No. | Scattering Coefficient |
|---|---|
| 1 | 0.44 |
| 2 | 1.55 |
| 3 | 0.59 |
| 4 | 0.99 |
| 5 | 0.61 |
| 6 | 0.53 |
| 7 | 1.07 |
| 8 | 1.64 |
| 9 | 0.97 |
| 10 | 1.46 |
| 11 | 0.43 |
| 12 | 1.90 |
| 13 | 0.41 |
| 14 | 1.44 |
| 15 | 1.44 |
| 16 | 0.82 |

It is readily apparent from the foregoing Table that treatment of kaolin with sodium hydroxide and/or potassium hydroxide at a concentration above 0.1 molality, and at a temperature exceeding 60° C., produces a pigment that possesses a significant increase in light scattering coefficient compared with unreacted kaolin. High degrees of treatment can increase the scattering coefficient by over 400 percent. Furthermore, the unexpected increase in scattering coefficient is accomplished without increasing the abrasion characteristics of the pigment, a common problem encountered with calcined kaolin. This is possible because the kaolin is treated at a temperature much lower than that required for calcination.

Leaching of the reacted samples with a reducing agent, namely sodium hydrosulfite, increases the brightness of the treated materials. Leaching is needed in reaction products which contain significant levels of hydroxysodalite, such as in Example 14 above, to remove iron discoloration and return the product to a sufficient level of whiteness.

Five of the foregoing examples were selected for a study in which each experimental pigment was mixed at a level with 90% unreacted kaolin. These blends were applied as paper coatings and the characteristics of the coated sheets were compared to sheets coated with a kaolin control that contained no experimental pigment. The result is shown in Table II.

TABLE II

| | LIGHTWEIGHT, COATED, CALENDERED SHEET DATA | | | | | |
|---|---|---|---|---|---|---|
| | Untreated Control | Example 15 | Example 14 | Example 10 | Example 12 | Example 8 |
| Coat Weight, #/3300 Ft² (Ash Method) | 4.8 | 4.7 | 4.7 | 4.8 | 5.0 | 4.9 |
| Gloss | 52 | 52 | 55 | 56 | 57 | 53 |
| GE Brightness | 70.0 | 70.7 | 71.0 | 70.5 | 70.9 | 71.3 |
| TAPPI Opacity | 78.6 | 79.3 | 79.8 | 79.9 | 80.5 | 80.1 |

It can be seen from he previous Table that the opacity, gloss and brightness of the coated sheets were improved by incorporating the experimental pigment in paper coatings.

I claim:

1. A process of making an opacifying kaolin pigment wherein hydrous kaolin is reacted in the presence of water with sodium hydroxide or potassium hydroxide to produce a substantially white pigment that exhibits a higher light scattering characteristic than kaolin unreacted with the hydroxide exhibits, wherein (a) the hydroxide is present in sufficient concentration to produce a molality of at least 0.1, (b) the reaction temperature is at least 60° C. and (c) the kaolin is present in a concentration of between 5 percent and 70 percent, by weight, with respect to the water.

2. The process of claim 1 wherein any hydroxysodalite constituent which causes the pigment not to be substantially white is leached with an iron reducing agent.

3. The process of claim 1 wherein the kaolin is reacted with the hydroxide and a sodium or potassium salt.

4. The process of claim 1 including the steps of washing the reaction product with neutral or acidified water, filtering and leaching the reaction product with a reducing leach, and dispersing the reaction product with a dispersing agent.

5. The product of the process of claim 1.

6. A process of making an opacifying pigment wherein hydrous kaolin is reacted in the presence of water with potassium hydroxide at a temperature of at least 60° C. and in a sufficient concentration to produce a molality of at least 0.1.

7. A process of making an opacifying pigment wherein hydrous kaolin is reacted in the presence of water with sodium hydroxide at a temperature of at least 60° C. and in a sufficient concentration to produce a molality of at least 0.1 and the reaction product is leached with an iron reducing agent to remove the discoloring constituent.

8. A process for making a kaolin pigment with enhanced opacifying characteristics for use in paper coating or filling materials, wherein the process comprises reacting hydrous kaolin in the presence of water with sodium hydroxide or potassium hydroxide, wherein (a) the hydroxide is present in sufficient concentration to produce a molality greater than 0.1, (b) the reaction temperature is at least 60° C. and (c) the kaolin is present in a concentration of between 5 percent and 70 percent, by weight, with respect to the water.

9. The process of claim 8 including the steps of washing the reaction product with neutral or acidified water, filtering and leaching the reaction product with a reducing leach, and dispersing the reaction product with a dispersing agent.

10. The product of the process of claim 8.

11. A paper coating or filler material that exhibits high light scattering characteristics and which is comprised of an opacifying kaolin pigment derived from the reaction of hydrous kaolin and sodium or potassium hydroxide, wherein (a) the hydroxide is present in sufficient concentration to produce a molality of at least 0.1, (b) the reaction temperature is between 60° C. and 250° C., and (c) the kaolin is present in a concentration of between 5 percent and 70 percent, by weight, with respect to the water.

12. The material of claim 11 further comprising a dispersing agent and an adhesive.

* * * * *